United States Patent
Scannell et al.

(10) Patent No.: US 10,875,657 B2
(45) Date of Patent: Dec. 29, 2020

(54) HOLD OPEN J-TRACK LOCKING MECHANISM FOR COWLING

(71) Applicant: Bell Helicopter Textron Inc., Fort Worth, TX (US)

(72) Inventors: Brent Scannell, Roxboro (CA); Thomas Mast, Carrollton, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 691 days.

(21) Appl. No.: 15/706,366

(22) Filed: Sep. 15, 2017

(65) Prior Publication Data

US 2019/0084686 A1 Mar. 21, 2019

(51) Int. Cl.
| B64D 29/08 | (2006.01) |
| B64C 1/14 | (2006.01) |
| B64C 27/00 | (2006.01) |
| E06B 3/48 | (2006.01) |
| E05D 15/26 | (2006.01) |
| B64D 29/06 | (2006.01) |

(52) U.S. Cl.
CPC ............ *B64D 29/08* (2013.01); *B64C 1/1446* (2013.01); *B64C 27/00* (2013.01); *B64D 29/06* (2013.01); *E05D 15/262* (2013.01); *E06B 3/483* (2013.01)

(58) Field of Classification Search
CPC ...... B64D 29/08; B64D 29/06; B64C 1/1446; B64C 27/00; E06B 3/483; E05D 15/262
See application file for complete search history.

(56) References Cited

U.S. PATENT DOCUMENTS

| 4,448,232 A | 5/1984 | McQueen et al. |
| 4,613,099 A * | 9/1986 | Smith ................... B64D 29/06 244/129.4 |
| 6,227,485 B1 | 5/2001 | Porte |
| 7,275,717 B2 | 10/2007 | Landry |

(Continued)

FOREIGN PATENT DOCUMENTS

| EP | 3059157 A1 | 8/2016 |
| EP | 3418183 B1 | 12/2019 |

(Continued)

OTHER PUBLICATIONS

EPO Search Report issued in EP Application 19201124.4 dated Feb. 18, 2020, 5 pages.

(Continued)

*Primary Examiner* — Assres H Woldemaryam
(74) *Attorney, Agent, or Firm* — Patent Capital Group

(57) ABSTRACT

In one embodiment of the present disclosure, there is provided an aircraft that includes a cowling having a j-track mounted on the inwardly facing surface and a rod pivotally connected to a stationary part of the aircraft at a first end and moveable within the j-track at a second end, so that, when the cowling is opened, the second end moves to lock into the j-shaped portion and hold the cowling open. In various embodiments, the first end may be pivotally connected to the aircraft by a quick release pin, and the second end may be connected to the j-track by a torsion spring. In another embodiment of the present disclosure, the cowling is a bi-folding cowl having an upper portion and a lower portion, where the rod and the lower portion may include structures for retaining the lower portion in an opened position.

23 Claims, 8 Drawing Sheets

(56) References Cited

U.S. PATENT DOCUMENTS

| | | | |
|---|---|---|---|
| 2004/0238687 | A1 | 12/2004 | Jones et al. |
| 2006/0261216 | A1 | 11/2006 | Landry |
| 2011/0174929 | A1 | 7/2011 | Rowbut et al. |
| 2013/0097940 | A1 | 4/2013 | Brown et al. |
| 2014/0334922 | A1 | 11/2014 | Fabre et al. |
| 2016/0031563 | A1 | 2/2016 | Pautis |
| 2016/0264249 | A1* | 9/2016 | Lozano ................. B64D 29/08 |
| 2018/0057183 | A1* | 3/2018 | Le Cadet ............... B64D 29/06 |
| 2018/0086473 | A1 | 3/2018 | Joel |
| 2019/0061902 | A1 | 2/2019 | Scannell et al. |

FOREIGN PATENT DOCUMENTS

| | | |
|---|---|---|
| FR | 2933071 A1 | 1/2010 |
| FR | 2933071 B1 | 6/2010 |
| WO | 2012148394 A1 | 11/2012 |

OTHER PUBLICATIONS

"Mermie Karger, 1938 Rolls-Royce Phantom III @ Pebble Beach," youtube Feb. 10, 2011, XP054977914, 2 pages; retrieved from the Internet: https://www.youtube.com/watch?v=GC75Sf8dHKk [retrieved on Nov. 24, 2017] *Video of 1938 Rolls-Royce Phantom III. See engine cowl opening at minute 2:33 of the video, the cowl being folded and rotated to lay on a surface above opening.*

EPO Search Report issued in EP Application 17196020.6 dated Apr. 23, 2017, 4 pages.

"Mermie Karger, 1938 Rolls-Royce Phantom III @ Pebble Beach," youtube, Feb. 10, 2011 (Feb. 10, 2011), XP054977914, 2 pages; retrieved from the Internet: URL:https://www.youtube.com/watch?v=GC75Sf8dHKk [retrieved on Nov. 24, 2017] *Video of 1938 Rolls-Royce Phantom III. See engine cowl opening at minute 2:33 of the video, the cowl being folded and rotated to lay on a surface above opening.*

EPO Search Report issued in EP Application 17196021.4 dated Dec. 12, 2017, 6 pages.

EPO Examination Report issued in EP Application 17196021.4 dated May 16, 2018, 5 pages.

EPO Examination Report issued in EP Application 19201134.4 dated Apr. 14, 2020, 6 pages.

EPO Official Action issued in EP Application 17196021.4 dated Feb. 16, 2018, 6 pages.

Bell 525 Relentless (Product Diagram), Bell Helicopter, A Textron Company; Flight International from Flightglobal, Tim Hall (FRAeS, Fort Worth, Texas), Reed Business Information, Published Nov. 12, 2014. (1 page).

Perry, Dominic, "ANALYSIS: Bell 525 Relentless Cutaway and Technical Description", Flight Global, Flight International, Bell Helicopter, Published Nov. 12, 2014. (8 pages).

USPTO Non-Final Office Action for U.S. Appl. No. 15/706,338 dated Jun. 23, 2020.

* cited by examiner ized to the specific orientations described or illustrated in the drawings.

HOLD OPEN J-TRACK LOCKING MECHANISM FOR COWLING

TECHNICAL FIELD

This disclosure relates generally to a cowling of an aircraft having a hold-open assembly for holding the cowling in an opened position, and more particularly, though not exclusively, to a hold-open assembly having a rod and a track with a reversed j-track position for locking a cowling in an opened position.

BACKGROUND

An aircraft generally includes a fuselage in which access openings are provided. Some access openings are designed to enable access to equipment areas such as aircraft engines to perform service and maintenance on the equipment. Each access opening typically is equipped with a cowling having limited opening ability unless the cowling is removed. Further, the cowling may be heavy and may require more than one person to open and prop the cowling open.

SUMMARY

This disclosure relates to a hold open assembly on a cowling of an aircraft, where the hold open assembly includes a hold rod and a j-track mechanism for locking the cowling in an opened position.

According to one aspect of the present disclosure, the aircraft includes a cowling having, when closed, a top edge positioned closer to the top side of the aircraft, a bottom edge positioned closer to the bottom side of the aircraft, and opposing inwardly facing and outwardly facing surfaces, a j-track mounted on the inwardly facing surface of the cowling with the j-shaped portion of the track facing positioned closer to the top edge, and a rod pivotally connected to a stationary part of the aircraft at a first end and moveable within the j-track at a second end, so that, when the cowling is opened, the rod pivots upwards at the first end, and moves downwards at the second end within the j-track to lock into the j-shaped portion and hold the cowling open. In various embodiments, the first end of the rod may be pivotally connected to the aircraft by a quick release pin for easy release of the rod when removing the cowling or laying the cowling flat along the top side of the aircraft. In various embodiments, the second end of the rod may be connected to the j-track by a torsion spring to assist with opening and moving the rod towards the short end of the j-shaped portion to lock the cowling in an opened position even with one handed opening. In various embodiments, the cowling having a hold rod with a j-track mechanism for locking the cowling in an opened position is on a rotorcraft.

According to one aspect of the present disclosure, the cowling is a bi-folding cowling having an upper portion and a lower portion, where the upper portion includes a j-track mounted on the inwardly facing surface with a rod connected to the j-track and extending from the j-track to pivotally connect to a stationary part of the aircraft. The upper and lower portions may be pivotally connected on adjacent sides, such that the bi-folding cowl may be opened by moving the lower portion upwardly and inwardly towards the upper portion, and, when in a fully-opened position, the inwardly facing surfaces of the upper and lower portions face each other. In various embodiments, the rod and/or the lower portion may include additional features or structures for retaining the lower portion in an opened position. In various embodiments, the rod may include a bend or a notch for holding or supporting the bottom edge of the lower portion of the cowling in an opened position. In various embodiments, the rod and the lower portion of the cowling may include mated structures to retain the lower portion in an opened position.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

Figure 1A:
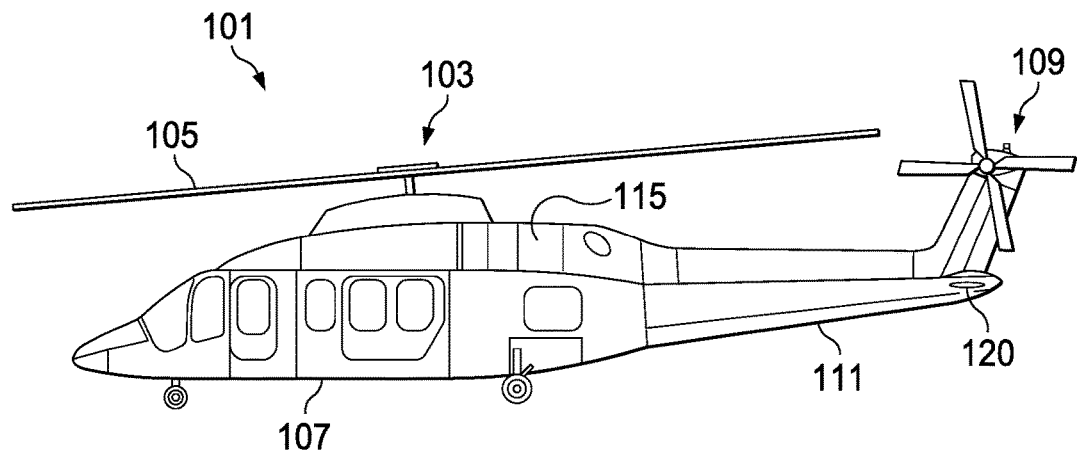
FIGS. 1A, 1B, and 2 illustrate example aircraft in accordance with certain embodiments.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

As used herein, the terms door, access panel, cowl, cowling, and fairing may be used interchangeably. Like reference numbers and designations in the various drawings indicate like elements. Further, the present disclosure may repeat reference numerals and/or letters in the various examples. This repetition is for the purpose of simplicity and clarity and does not in itself dictate a relationship between the various embodiments and/or configurations discussed.

The details of one or more implementations of the subject matter described in this disclosure are set forth in the accompanying drawings and the description below. Other features, aspects, and advantages of the subject matter will become apparent from the description, the drawings, and the claims.

Figure 1B:
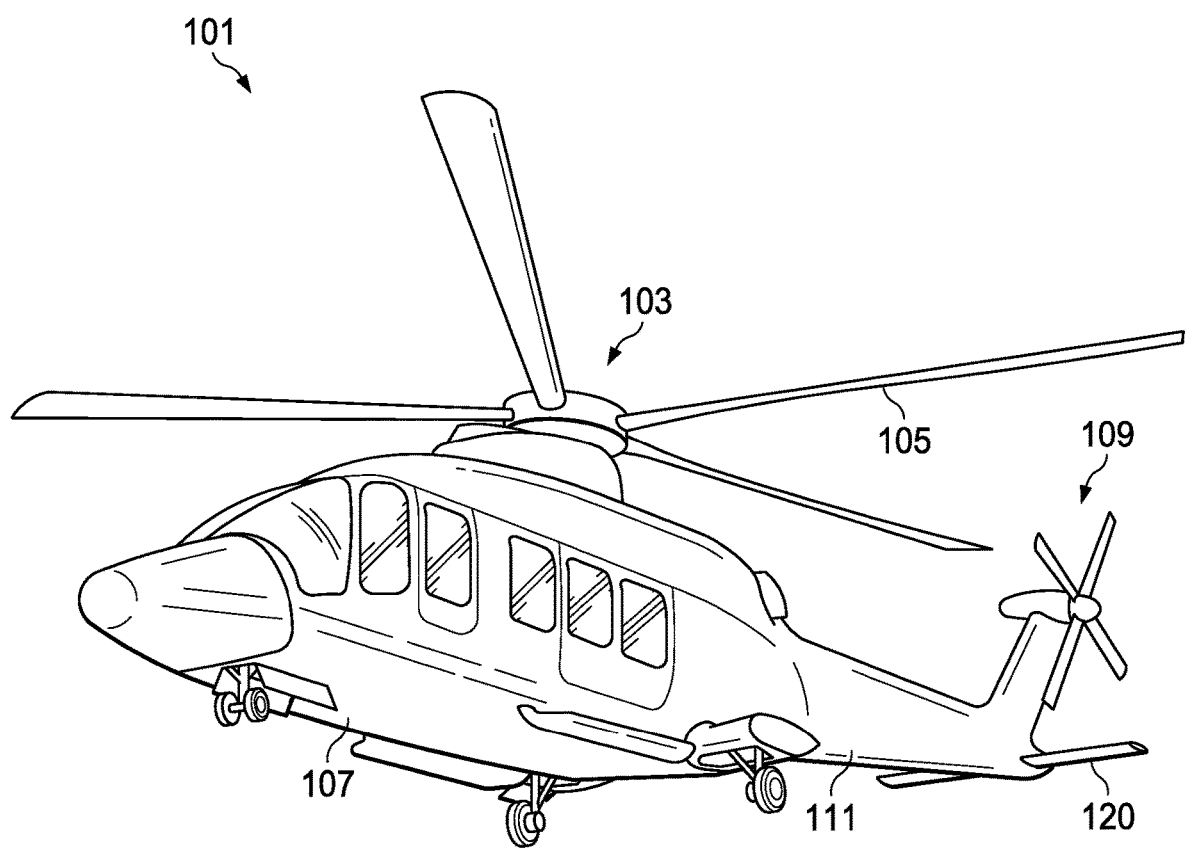
Figure 2:
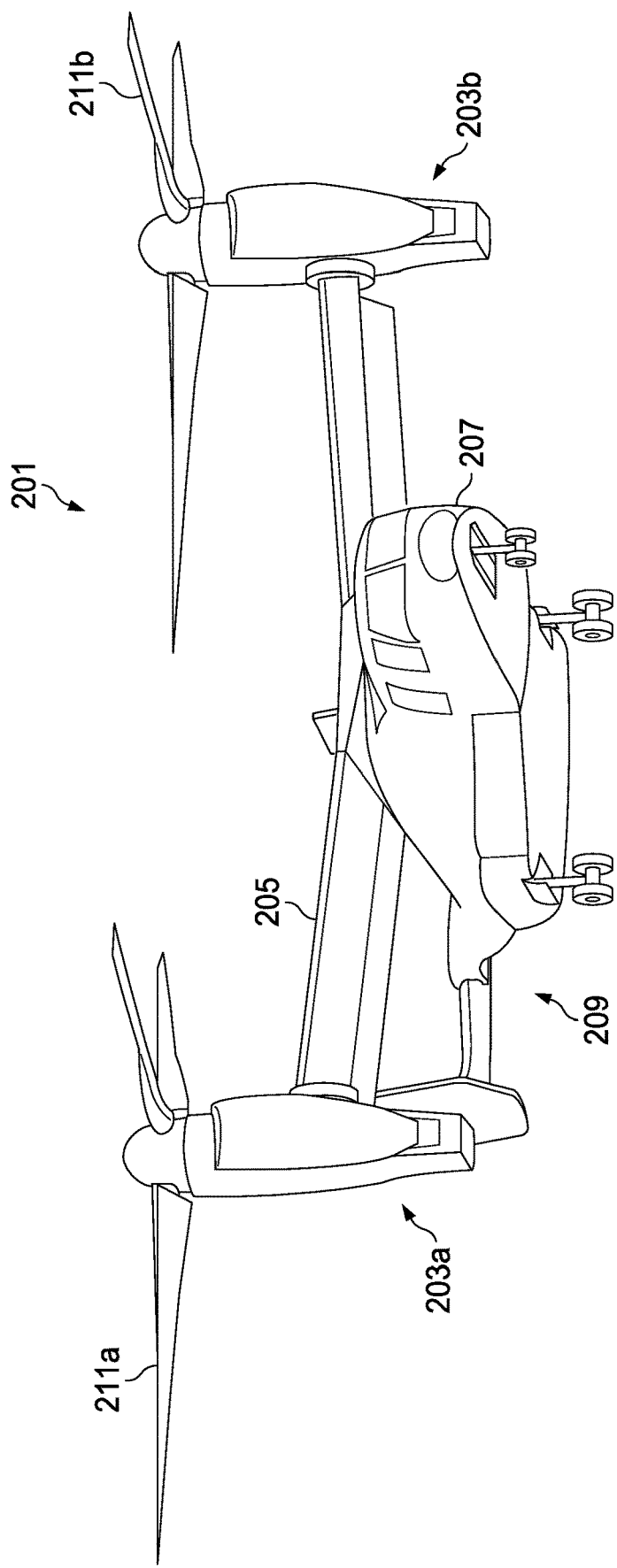

FIGS. 1A, 1B, and 2 illustrate various example aircraft in accordance with certain embodiments, as discussed further below.

FIGS. 1A and 1B illustrate an example embodiment of a rotorcraft 101. FIG. 1A illustrates a side view of rotorcraft 101, while FIG. 1B illustrates a perspective view of rotorcraft 101. Rotorcraft 101 has a rotor system 103 with a plurality of rotor blades 105. The pitch of each rotor blade 105 may be managed or adjusted in order to selectively control direction, thrust, and lift of rotorcraft 101. Rotorcraft 101 further includes a fuselage 107, anti-torque system 109, an empennage 111, and a tail structure 120. In this example, tail structure 120 can represent a horizontal stabilizer. Torque is supplied to rotor system 103 and anti-torque system 109 using at least one engine. FIG. 1A further illustrates an engine cowl 115 for covering a rotorcraft engine. Similarly, other cowlings may cover other components of rotorcraft, such as an auxiliary power unit (APU) or a transmission (not shown).

FIG. 2 illustrates a perspective view of an example tiltrotor aircraft 201. Tiltrotor aircraft 201 can include nacelles 203a and 203b, a wing 205, a fuselage 207, and a tail structure 209. In this example, tail structure 209 can represent a vertical stabilizer. Each nacelle 203a and 203b can include an engine and gearbox for driving rotor systems 211a and 211b, respectively. Nacelles 203a and 203b are each configured to rotate between a helicopter mode, in which the nacelles 203a and 203b are approximately vertical, and an airplane mode, in which the nacelles 203a and 203b are approximately horizontal.

It should be appreciated that rotorcraft 101 of FIGS. 1A and 1B and tiltrotor aircraft 201 of FIG. 2 are merely illustrative of a variety of aircraft that can be used to implement embodiments of the present disclosure. Other aircraft implementations can include, for example, fixed wing airplanes, hybrid aircraft, unmanned aircraft, gyrocopters, and a variety of helicopter configurations, among other examples. Moreover, it should be appreciated that even though aircraft are particularly well suited to implement embodiments of the present disclosure, the described embodiments can also be implemented using non-aircraft vehicles and devices.

Introduction to the Invention

The embodiments described throughout this disclosure provide numerous technical advantages, including a hold open assembly on a cowling of an aircraft having a hold rod with a j-track mechanism for locking the cowling in an opened position. In various embodiments, the cowling having a hold rod with a j-track mechanism for locking the cowling in an opened position is on a rotorcraft.

Figure 3A:
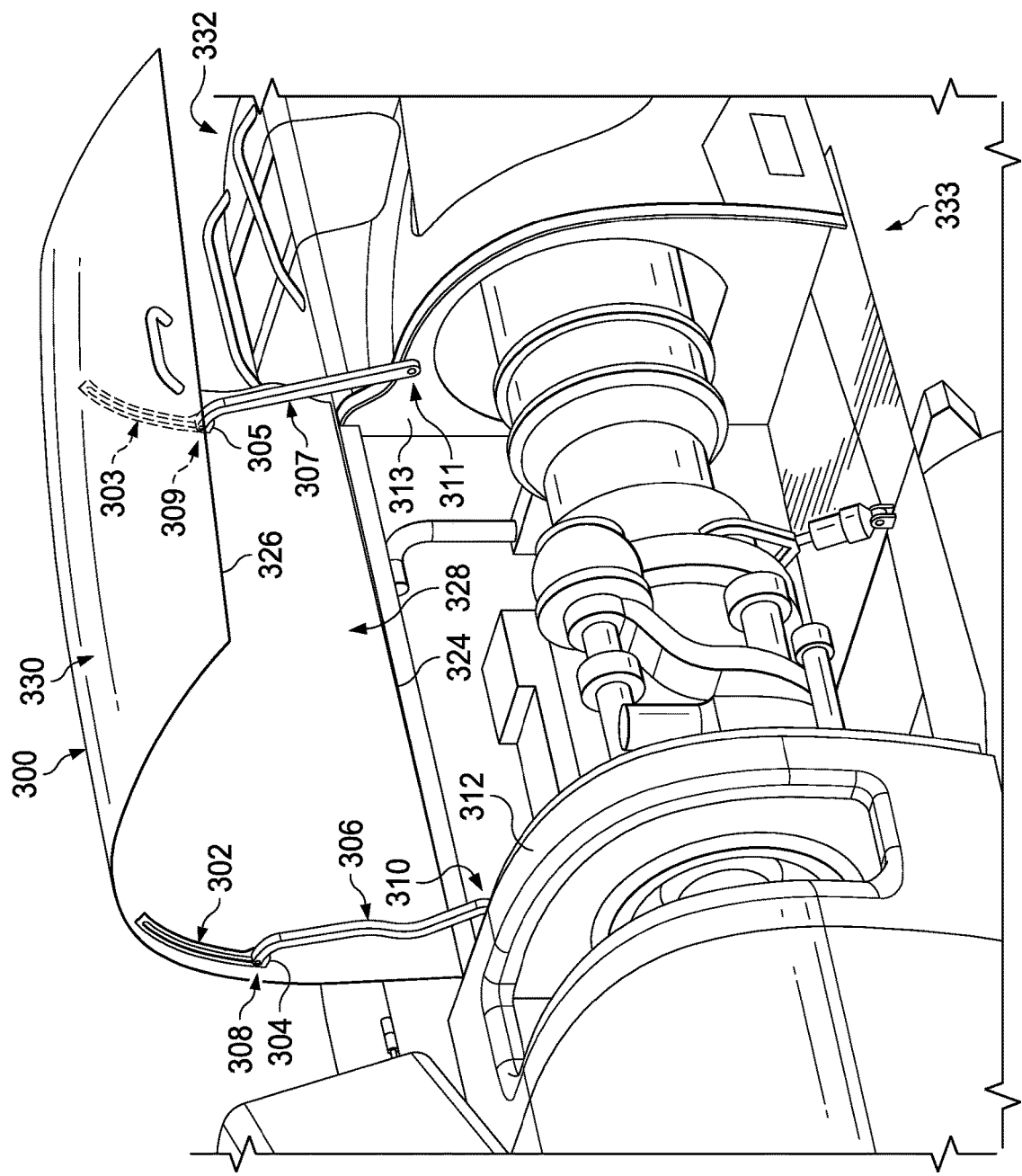
FIG. 3A illustrates a cowling having a hold rod with a j-track mechanism locked in an opened position, in accordance with various embodiments.

FIG. 3A illustrates a cowling having a hold rod with a j-track mechanism in a locked open position, in accordance with various embodiments. As shown in FIG. 3A, cowling 300 may include a top edge 324 positioned closer to the top side of the aircraft 332, when the cowling is in a closed position, and a bottom edge 326 positioned closer to the bottom side of the aircraft 333. Cowling 300 may further include opposing inwardly facing 328 and outwardly facing 330 surfaces. Cowling 300 may be opened by moving bottom edge upwardly, such that the cowling is positioned over the center of the top surface of the aircraft 332. Cowling 300 may include one or more j-tracks 302, 303 mounted on the inwardly facing surface 328 with the j-shaped portion 304, 305 of the track positioned closer to the top edge 324, and may include one or more rods 306, 307 pivotally connected to a stationary part of the aircraft 312, 313 at a first end 310, 311 and connected to and moveable within the j-track at a second end 308, 309 so that, when the cowling is opened, the rod pivots upwards at the first end 310, 311 and moves downwards at the second end 308, 309 within the j-track to lock into the j-shaped portion and hold the cowling open.

Cowling 300 may be constructed from any suitable material, for example, steel, aluminum, aluminum alloy, reinforced plastics, and advanced composites, such as carbon fiber reinforced polymer (CFRP), among others.

J-track 302, 303 may be made of any suitable material having the desired properties for durability, reliability, strength, stiffness, sustainability, and performance after exposure to engine bay temperatures, including steel, titanium, CRES (corrosion resistant steel), and aluminum, among others, to enable the cowling to be opened, locked open, and closed. J-track 302, 303 may be mounted to the inwardly facing surface of cowling 300 by any suitable means, for example, screws or rivets, and may be mounted in any suitable location. J-track 302, 303 may be mounted with the j-shaped portion 304, 305 facing towards the top edge 324 of cowling 300 so that, when the cowling is opened, the second end 308, 309 of rod 306, 307 moves within j-track and locks into j-shaped portion 304, 305 to hold cowling 300 in an opened position. J-track 302, 303 may be mounted with the j-shaped portion facing inwardly towards the inwardly facing surface 328 of cowling 300 or facing outwardly from the inwardly facing surface 328.

Rod 306, 307 may be made of any suitable material having the desired properties for durability, reliability, strength, stiffness, sustainability, and performance after exposure to engine bay temperatures, including steel, titanium, CRES (corrosion resistant steel), and aluminum, among others, and may be any suitable size and shape for to enable the cowling to be opened, locked open, and closed. For example, rod 306, 307 may be straight or may have one or more bends for providing a support structure or for more easily storing the rod when the cowling is closed. First end 310, 311 of rod 306, 307 may be mounted to any suitable stationary part of the aircraft, including, for example, a firewall, a floor, aircraft equipment, engine deck (floor of engine bay), fuselage, or another cowling, which provides a fixed rotation point. Rod 306, 307 may be attached or connected at the first end using any suitable mechanism, including, for example, pins, screws, rivets, or the like, to enable fastening and rotation. Rod 306, 307 may be attached or connected at the second end using any suitable mechanism, including, for example, pins, screws, rivets, or the like, to enable translating through the j-track.

Figure 3B:
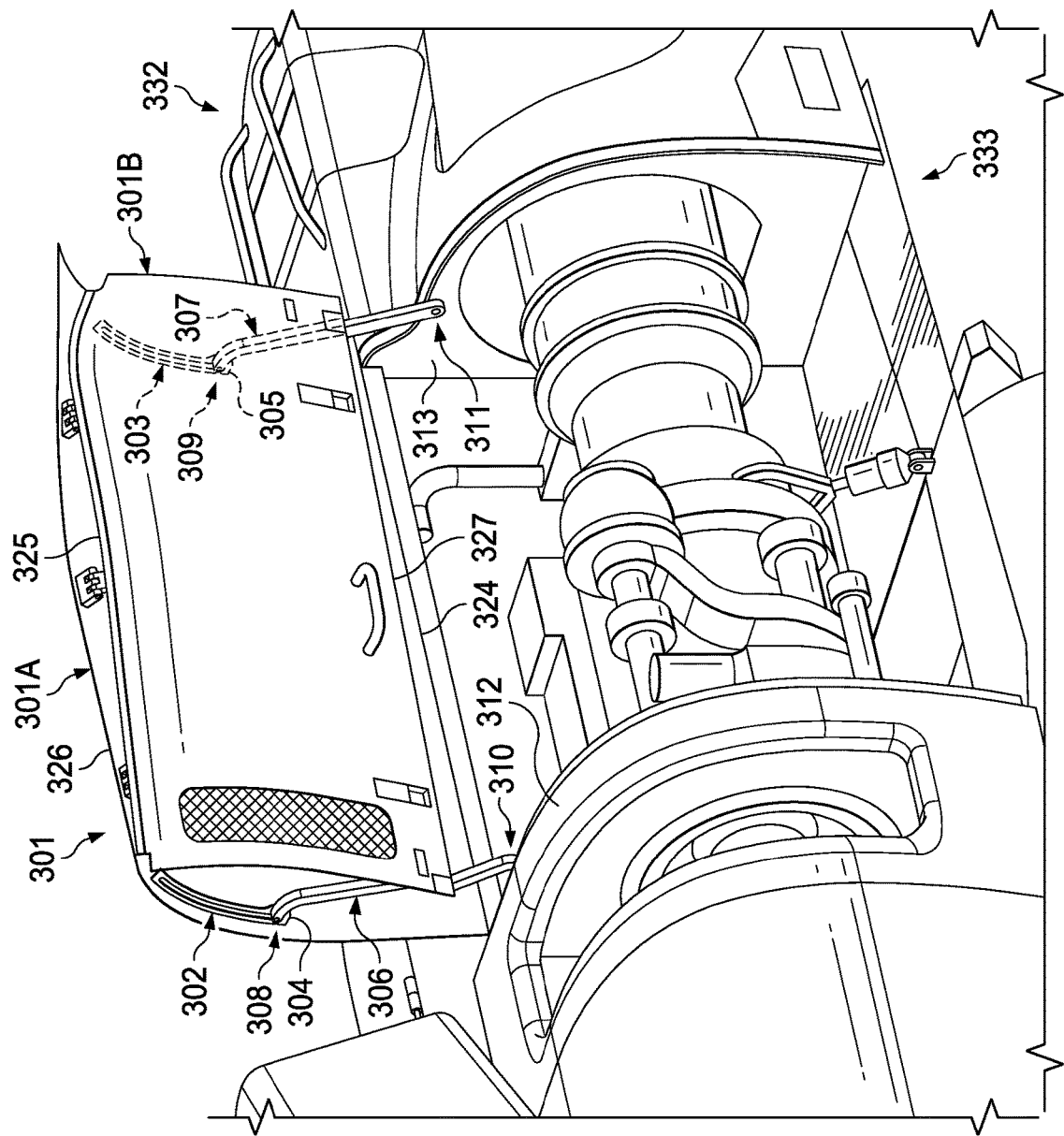
FIG. 3B illustrates a bi-fold cowling having a hold rod with a j-track mechanism locked in an over-center, opened position, in accordance with various embodiments.
Figure 4:
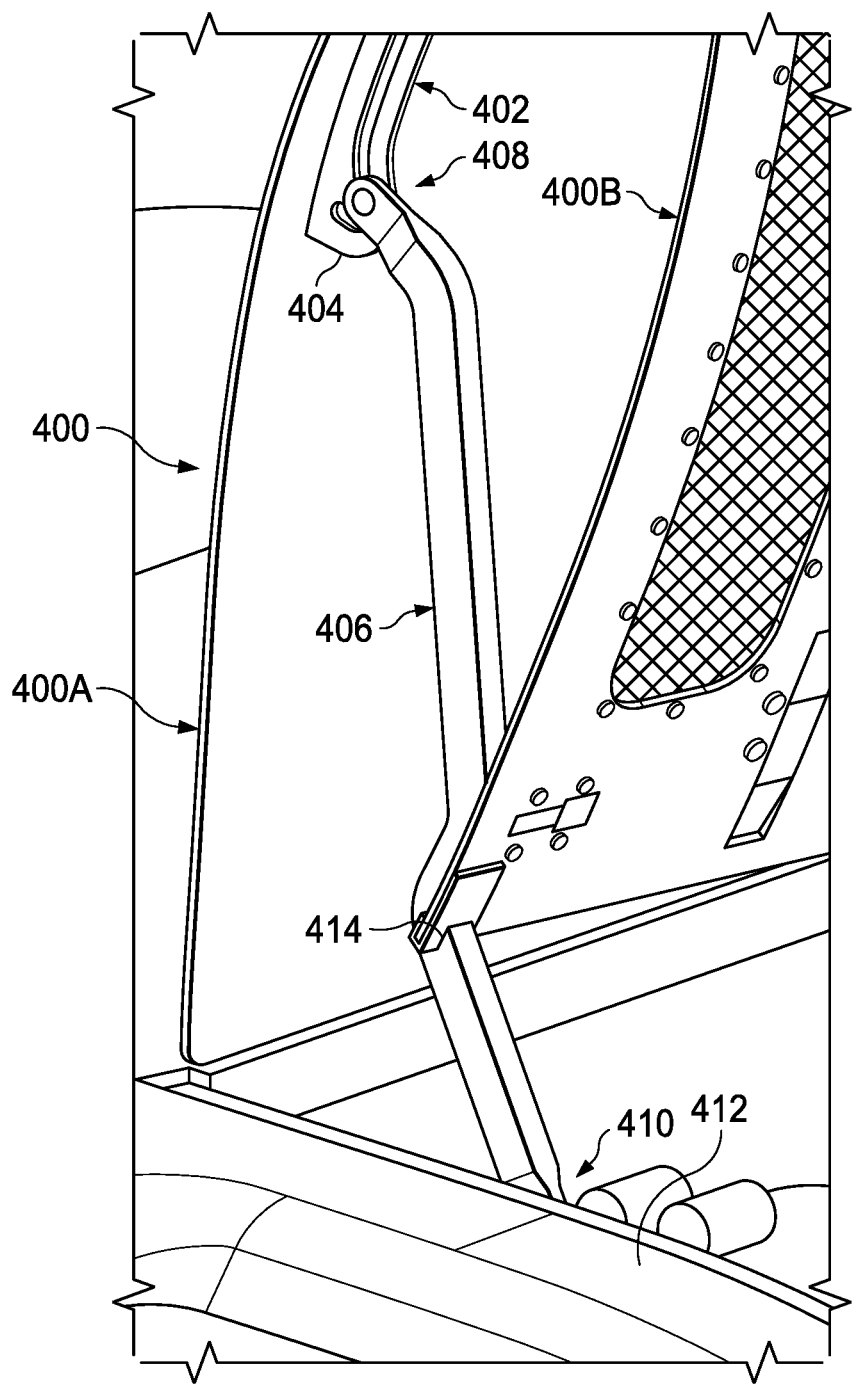
FIG. 4 illustrates details of a hold rod with a j-track mechanism on a bi-fold cowling locked in an opened position, in accordance with various embodiments.

FIG. 3B illustrates a bi-fold cowling having a hold rod with a j-track mechanism in a locked open position, in accordance with various embodiments. As shown in FIG. 3, cowling 301 may be a bi-fold cowling having an upper portion 301A and a lower portion 301B, each upper and lower portion may include a top edge 324, 325 positioned closer to the top side of the aircraft 332, when the cowling is in a closed position, and a bottom edge 326, 327 positioned closer to the bottom side of the aircraft 333. Upper portion 301A and lower portion 301B may further include opposing inwardly facing 328, 329 and outwardly facing 330, 331 surfaces. Cowling 301 may be opened by moving the lower portion 301B upwardly and inwardly towards the upper portion 301A, such that the inwardly facing surfaces of the upper and lower portions face each other and the upper and lower portions are positioned over the center of the top surface of the aircraft. Cowling 301 may include one or more j-tracks 302, 303 mounted on the inwardly facing surface of the upper portion 301A of the cowling, with the j-shaped portion 304, 305 of the track positioned closer to the top edge 324, and one or more rods 306, 307 pivotally connected to a stationary part of the aircraft 312, 313 at a first end 310, 311 and connected to and moveable within the j-track at a second end 308, 309 so that, when the cowling is opened, the rod pivots or rotates upward at the first end 310, 311 and moves downward at the second end 308, 309 within the j-track to lock into the j-shaped portion 304, 305 and hold the cowling in an opened positioned. In various embodiments, cowling 301 is on a rotorcraft. In various embodiments, cowling 301 is an engine cowling on a rotorcraft FIG. 4 illustrates details of a hold rod with a j-track mechanism on a bi-fold cowling locked in an opened position, in accordance with various embodiments. As shown in FIG. 4, cowling 400 may be a bi-fold cowling having an upper portion 400A and a lower portion 400B where the inwardly facing surfaces of the upper and lower portions face each other when in an opened position. Cowling 400 may include j-track 402 mounted on the inwardly facing surface of the upper portion 400A of the cowling with a j-shaped portion 404, and a rod 406 pivotally connected to a stationary part of the aircraft 412 at a first end 410 and moveable within the j-track at a second end 408 so that, when the cowling is opened, the rod pivots upward at the first end 410 and moves downward at the second end 408 within the j-track to lock into the j-shaped portion 404 and hold the cowling in an opened positioned. In various embodiments, rod 406 may be designed based on desired functionality, sturdiness, durability, ease of use, and ability to store when opening and closing the cowling as well as storing the rod when the cowling is closed. For example, rod 406 may be straight or, as shown in FIG. 4, may include one or more bends. In various embodiments, rod 406 may include additional features or structures, such as a notch 414, for supporting and/or holding the lower portion 400B in an opened position.

Figure 5:
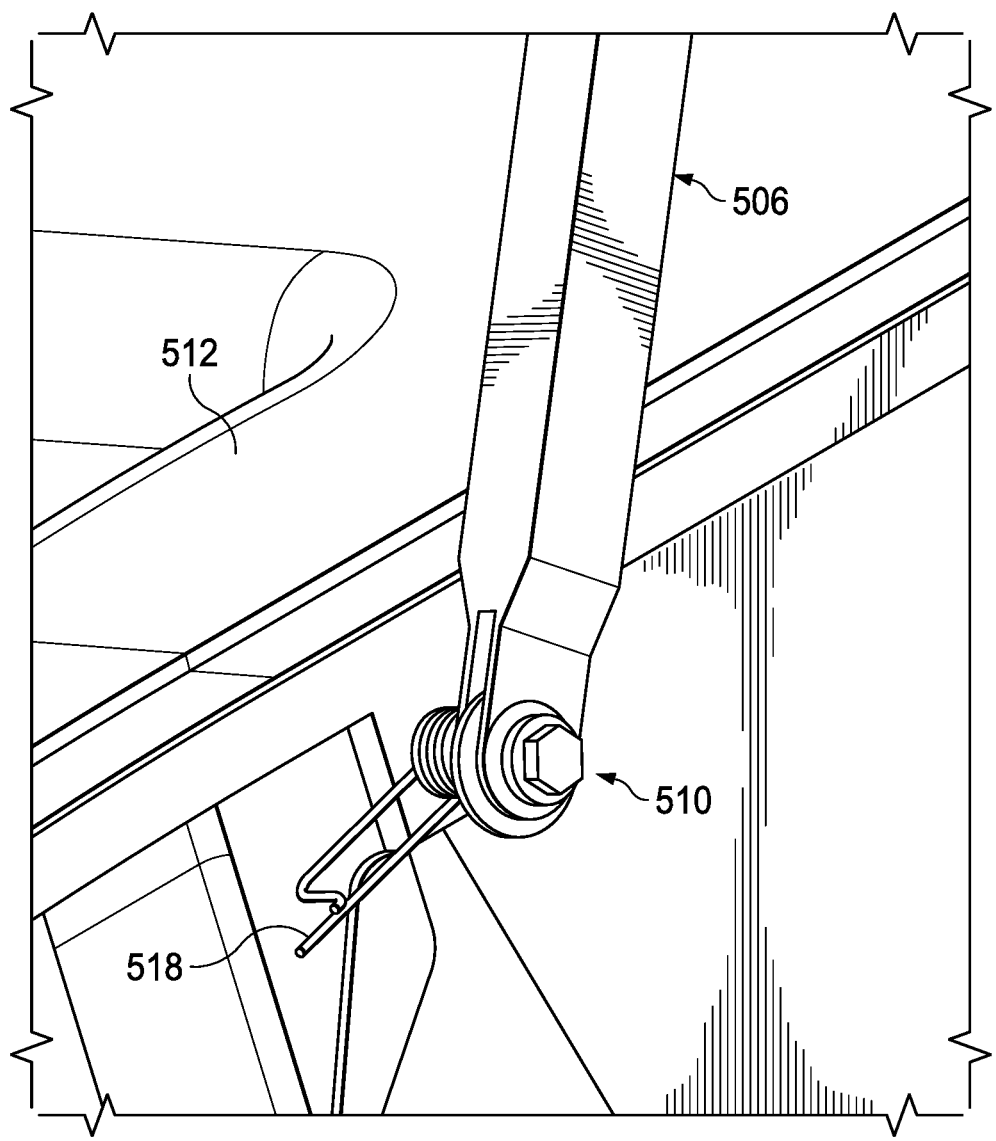
FIG. 5 illustrates details of a first end of a hold rod on a cowling, in accordance with various embodiments.

FIG. 5 illustrates details a first end of a hold rod on a cowling having a j-track mechanism, in accordance with various embodiments. First end 510 of hold rod 506 may be pivotally connected to a stationary part of the aircraft, which may include, for example, a firewall 512, a sidewall, a floor, aircraft equipment, engine deck (floor of engine bay), or fuselage. First end 510 of hold rod 506 may be pivotally attached to a stationary part of the aircraft using any suitable means, for example, a bolt, a screw, a rivet, or a pin, that enables fastening and rotation. In various embodiments, first end 510 of rod 506 may be pivotally connected to the aircraft by a quick release pin 518 for releasing or disconnecting the rod from the aircraft at the first end when fully removing the cowling or laying the cowling flat along the top side of the aircraft.

Figure 6:
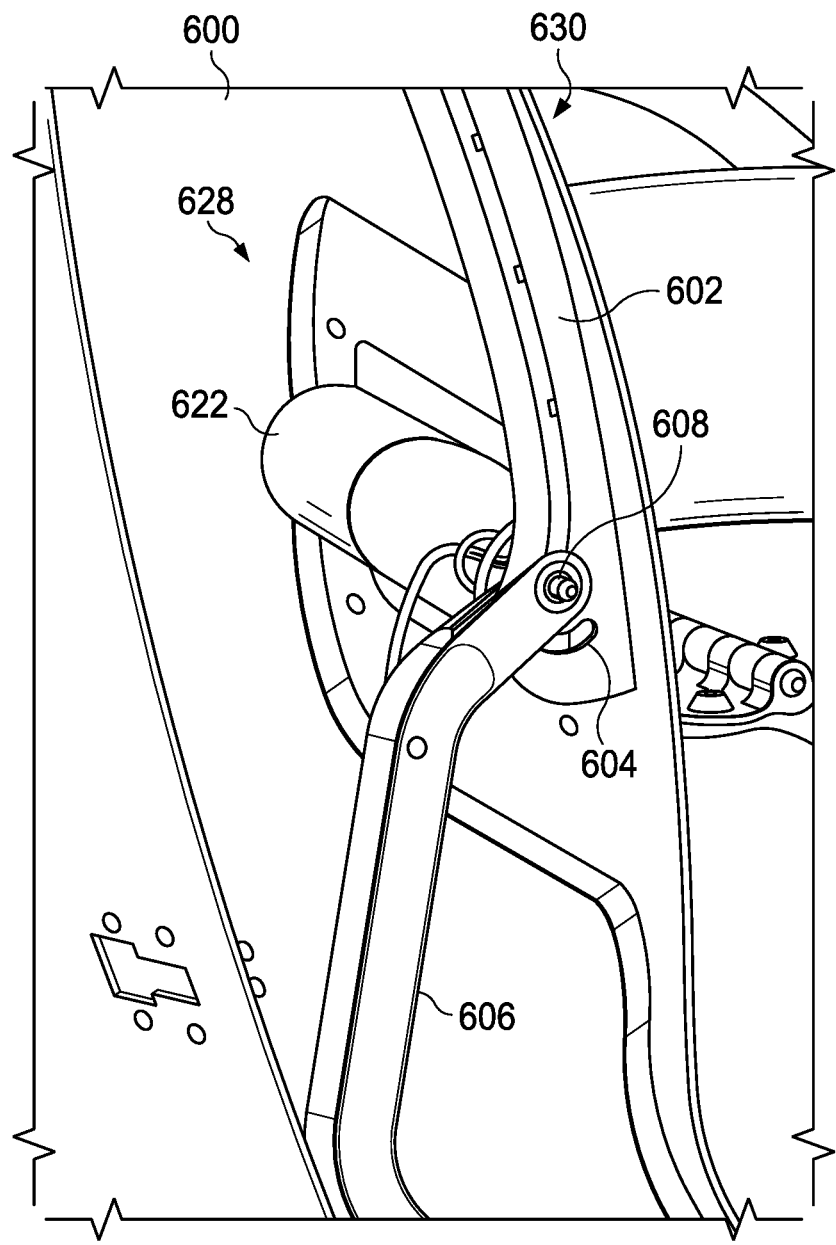
FIG. 6 illustrates details of a second end of a hold rod with a j-track mechanism on a cowling, in accordance with various embodiments.

FIG. 6 illustrates details of a second end of a hold rod with a j-track mechanism on a cowling, in accordance with various embodiments. In various embodiments, the second end of the rod may be connected to the j-track by a torsion spring to assist with releasing the rod from the j-shaped portion of the j-track when closing the cowling. As shown in FIG. 6, cowling 600 may include rod 606 connected at a second end 608 to j-track 602 and moveable within the j-track so that when the cowling is opened, rod 606 moves downward at the second end 608 within the j-track 602 to lock into the j-shaped portion 604 and hold the cowling in an opened positioned. Second end 608 may be connected to j-track 602 using any suitable means, including, for example, a bolt, a screw, a rivet, or a pin. In various embodiments, second end 608 is connected to j-track 602 by a torsion spring 622, where the torsion spring 622 helps to move the second end 608 towards the short section of the j-shaped portion and lock the cowling in an opened position. In various embodiments, j-track 602 may be mounted on the inwardly facing surface of the cowling with the j-shaped portion 604 of the track positioned facing outwardly 630, as shown, or facing inwardly 628.

Figure 7:
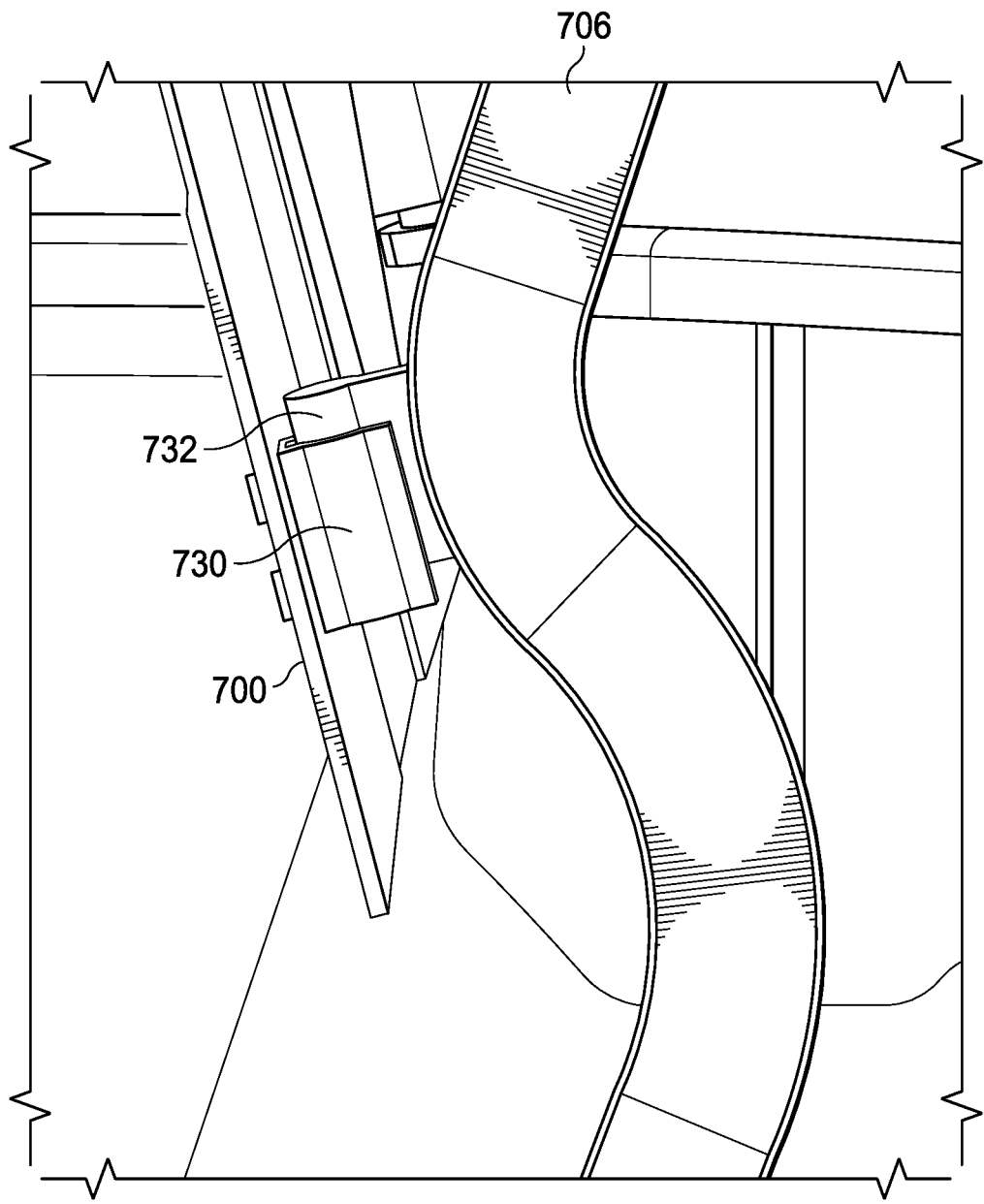
FIG. 7 illustrates details of a structure on a hold rod with a j-track mechanism for locking the lower portion of a bi-fold cowling in an opened position, in accordance with various embodiments.

FIG. 7 illustrates details of a hold rod with a j-track mechanism on a bi-fold cowling having a structure for locking the lower portion of the cowling to the hold rod, in accordance with various embodiments. As shown in FIG. 7, a lower portion of a bi-fold cowling 700 and rod 706 may include features or structures for connecting the lower portion 700 to rod 706 and retaining in an opened position. As shown in FIG. 7, the structure for connecting the lower portion of cowling 700 to rod 706 may include male and female mated features, such as a clamp, a clip, a spring clip, or a flange 730 and a knob or protrusion 732.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

In order to assist the United States Patent and Trademark Office (USPTO), and any readers of any patent issued on this application, in interpreting the claims appended hereto, it is noted that: (a) Applicant does not intend any of the appended claims to invoke paragraph (f) of 35 U.S.C. § 112, as it exists on the date of the filing hereof, unless the words "means for" or "steps for" are explicitly used in the particular claims; and (b) Applicant does not intend, by any statement in the specification, to limit this disclosure in any way that is not otherwise expressly reflected in the appended claims.

What is claimed is:

1. An aircraft hold-open assembly comprising:
a cowling on an aircraft having opposing inwardly-facing and outwardly-facing surfaces; a j-track having a j-shaped portion and a straight portion mounted on the inwardly-facing
surface of the cowling, wherein the j-shaped portion of the j-track is positioned towards an edge of the cowling closest to a top surface of the aircraft; and
a rod having a first end and a second end, wherein the first end is pivotally connected to a stationary part of the aircraft, and wherein the second end is connected to the j-track and, when the cowling is opened, moves into the j-shaped portion and locks the cowling open.

2. The aircraft hold-open assembly of claim 1, wherein the first end is pivotally connected to the aircraft by a quick release pin.

3. The aircraft hold-open assembly of claim 1, wherein the first end is pivotally connected to a firewall.

4. The aircraft hold-open assembly of claim 1, wherein the second end is connected to the j-track by a torsion spring.

5. The aircraft hold-open assembly of claim 1, wherein the cowling is a bi-folding cowl having an upper portion and a lower portion, and wherein the j-track is mounted on the inwardly-facing surface of the upper portion.

6. The aircraft hold-open assembly of claim 5, wherein the rod further comprises: a structure for retaining the lower portion of the bi-folding cowl in an opened position.

7. The aircraft hold-open assembly of claim 5, wherein the rod further comprises a first part of a mated structure and the lower portion of the cowling further comprises a second part of the mated structure, and wherein, when the cowling is open, the first part and second part are mated to retain the lower portion of the cowling in an opened position.

8. The aircraft hold-open assembly of claim 1, wherein the aircraft is a rotorcraft.

9. An aircraft apparatus comprising:
a cowling on an aircraft, when closed, having a top edge positioned closer to a top surface of the aircraft, a bottom edge positioned closer to a bottom surface of the aircraft, and opposing inwardly-facing and outwardly-facing surfaces;
a j-track having a j-shaped portion and a straight portion mounted on an inwardly-facing surface of the cowling, wherein the j-shaped portion of the j-track is positioned towards the top edge of the cowling; and
a rod having a first end and a second end, wherein the first end is pivotally connected to a stationary part of an aircraft, and wherein the second end is connected to the j-track and, when the cowling is opened, moves into the j-shaped portion and locks the cowling open.

10. The aircraft apparatus of claim 9, wherein the first end is pivotally connected to the aircraft by a quick release pin.

11. The aircraft apparatus of claim 9, wherein the first end is pivotally connected to a firewall.

12. The aircraft apparatus of claim 9, wherein the second end is connected to the j-track by a torsion spring.

13. The aircraft apparatus of claim 9, wherein the cowling is a bi-folding cowl having an upper portion and a lower portion; wherein, when the cowling is in a closed position, the upper portion is positioned closer to the top side of the aircraft and the lower portion is positioned closer to the bottom side of the aircraft; and wherein the j-track is mounted on the inwardly-facing surface of the upper portion.

14. The aircraft apparatus of claim 13, wherein the rod further comprises: a structure for retaining the lower portion of the bi-folding cowl in an opened position.

15. The aircraft apparatus of claim 13, wherein the rod further comprises a first part of a mated structure and the lower portion of the cowling further comprises a second part of the mated structure; and wherein, when the cowling is open, the first part and second part are mated to retain the lower portion of the cowling in an opened position.

16. The aircraft apparatus of claim 9, wherein the aircraft is a rotorcraft.

17. A rotorcraft, comprising:
a cowling, when closed, having a top edge positioned closer to a top side of the rotorcraft, a bottom edge positioned closer to a bottom side of the rotorcraft, and opposing inwardly facing and outwardly facing surfaces;
a j-track having a j-shaped portion and a straight portion mounted on an inwardly-facing surface of the cowling, wherein the j-shaped portion of the j-track is positioned towards the top edge of the cowling; and
a rod having a first end and a second end, wherein the first end is pivotally connected to a stationary part of the rotorcraft, and wherein the second end is connected to the j-track and, when the cowling is opened, moves into the j-shaped portion and locks the cowling open.

18. The rotorcraft of claim 17, wherein the first end is pivotally connected to the rotorcraft by a quick release pin.

19. The rotorcraft of claim 17, wherein the first end is pivotally connected to a firewall.

20. The rotorcraft of claim 17, wherein the second end is connected to the j-track by a torsion spring.

21. The rotorcraft of claim 17, wherein the cowling is a bi-folding cowl having an upper portion and a lower portion; wherein, when the cowling is in a closed position, the upper portion is positioned closer to the top side of the rotorcraft and the lower portion is positioned closer to the bottom side of the rotorcraft; and wherein the j-track is mounted on the inwardly-facing surface of the upper portion.

22. The rotorcraft of claim 21, wherein the rod further comprises: a structure for retaining the lower portion of the bi-folding cowl in an opened position.

23. The rotorcraft of claim 21, wherein the rod further comprises a first part of a mated structure and the lower portion of the cowling further comprises a second part of the mated structure, and wherein, when the cowling is open, the first part and second part are mated to retain the lower portion of the cowling in an opened position.

* * * * *